United States Patent
Wu et al.

(10) Patent No.: US 12,290,140 B2
(45) Date of Patent: May 6, 2025

(54) INTEGRATED FABRIC BASED POWER-GENERATING INSOLE AND METHOD OF MANUFACTURING THE SAME

(71) Applicant: Calson Investment Limited, North Point (HK)

(72) Inventors: Chou Har Wu, North Point (HK); Bingang Xu, Kowloon (HK); Meiqi Li, Kowloon (HK); Yuanyuan Gao, Kowloon (HK); Yujue Yang, Kowloon (HK)

(73) Assignee: Calson Investment Limited, North Point (HK)

( * ) Notice: Subject to any disclaimer, the term of this patent is extended or adjusted under 35 U.S.C. 154(b) by 616 days.

(21) Appl. No.: 17/463,510

(22) Filed: Aug. 31, 2021

(65) Prior Publication Data

US 2022/0218066 A1    Jul. 14, 2022

Related U.S. Application Data

(60) Provisional application No. 63/136,902, filed on Jan. 13, 2021.

(51) Int. Cl.
*A43B 3/38* (2022.01)
*A43B 3/36* (2022.01)
(Continued)

(52) U.S. Cl.
CPC .................. *A43B 3/38* (2022.01); *A43B 3/36* (2022.01); *A43B 3/42* (2022.01); *A43B 17/006* (2013.01);
(Continued)

(58) Field of Classification Search
CPC ........... A43B 3/38; A43B 3/36; A43B 17/006; A43B 3/42; B32B 5/026; B32B 5/262;
(Continued)

(56) References Cited

U.S. PATENT DOCUMENTS

| 2014/0338458 A1* | 11/2014 | Wang | G01H 11/06 |
| | | | 310/309 |
| 2015/0061460 A1* | 3/2015 | Bae | H02N 1/04 |
| | | | 977/948 |
| 2018/0160911 A1* | 6/2018 | Fu | A61B 5/4815 |

FOREIGN PATENT DOCUMENTS

| CN | 104253562 A | * 12/2014 | ............... H02N 1/04 |
| CN | 108696173 A | * 10/2018 | ........... A43B 3/0015 |
| CN | 108926067 A | 12/2018 | |

OTHER PUBLICATIONS

Machine Translation CN104253562 (Year: 2014).*
Machine Translation CN108696173 (Year: 2018).*

* cited by examiner

*Primary Examiner* — Jennifer A Steele

(57) ABSTRACT

The present invention discloses a power-generating insole based on fabric integration, which comprises a power-generating insole body, a detachable outer layer and an electronic module; The power-generating insole comprises a first friction component, a second friction component and a fabric composite component; The first friction component is composed of a first electrode layer and a first polymer material; The first friction component and the fabric composite component are integrally formed; The second friction component is wrapped around the middle part of the fabric composite component, and is integrated with the first friction component and the fabric composite component; The detachable outer layer is wrapped on the surface of the power-generating insole body; The electronic module is connected to the power-generating insole body; The present invention has long service life, good flexibility, plasticity, is washing resistance and stability.

12 Claims, 6 Drawing Sheets

(51) Int. Cl.
*A43B 3/42* (2022.01)
*A43B 17/00* (2006.01)
*B32B 3/04* (2006.01)
*B32B 5/02* (2006.01)
*B32B 5/26* (2006.01)
*B32B 7/025* (2019.01)
*H02N 1/04* (2006.01)

(52) U.S. Cl.
CPC ................ *B32B 3/04* (2013.01); *B32B 5/026* (2013.01); *B32B 5/262* (2021.05); *B32B 7/025* (2019.01); *H02N 1/04* (2013.01); *B32B 2255/02* (2013.01); *B32B 2255/26* (2013.01); *B32B 2307/20* (2013.01); *B32B 2437/00* (2013.01)

(58) Field of Classification Search
CPC .. B32B 7/025; B32B 5/26; H02N 1/04; D10B 2401/18; D10B 2403/02431
See application file for complete search history.

A: The content of the first polymer material
B: The content of the second polymer material content
C: The content of the substrate non-nanofiber fabric

INTEGRATED FABRIC BASED POWER-GENERATING INSOLE AND METHOD OF MANUFACTURING THE SAME

CROSS REFERENCE TO RELATED APPLICATIONS

The present application claims the benefit of U.S. Provisional Application No. 63/136,902 filed Jan. 13, 2021 and entitled "INTEGRATED FABRIC BASED POWER-GENERATING INSOLE AND METHOD OF MANUFACTURING THE SAME," which is hereby incorporated by reference in its entirety.

TECHNICAL FIELD

The present invention relates to the fields of textile and clothing, energy technology and electronic information, in particular to a power-generating insole based on fabric integration and its preparation is method.

BACKGROUND

With the improvement of living standards and the development of science and technology, people also have higher and higher requirements for fashion and technology of clothing. Therefore, various types of luminous shoes came into being. Currently, most of the luminous shoes on the market are powered by batteries, such as button batteries and rechargeable batteries. However, these batteries inevitably have disadvantages such as short service life and the need for frequent replacement of batteries or recharging of batteries.

The friction nanogenerator is a new energy technology which can convert mechanical energy generated by human movement into electrical energy. When walking and running, people constantly step on their feet, generating a lot of mechanical energy. How to convert this mechanical energy into electrical energy and make use of it has become a problem of great concern at present. In the application for the patent of China patent application number 201810719098.4, titled "A Kind of Friction Nano Power-generating Shoe Body", a sole and a vamp are provided, and an isolation layer is provided between the sole and the vamp, the friction generator is set at the bottom of the power-generating shoe, and multiple is friction generators are set, which are independent of each other, and form the friction power-generating body through assembly with the cover plate, support column and spring and other mechanical parts. When the human body is walking and stepping on, the cover plate drives the support body and the spring to compress and then extrude the friction power-generating part to contact, generating electric current. The friction power-generating shoe body is not integrated, has a more complex assembly process, poor stability of mechanical parts, poor fatigue resistance performance and short service life.

DESCRIPTION OF THE INVENTION

The main purpose of the present invention is to provide a power-generating insole based on fabric integration and its preparation method, which is used to solve the problems such as complex assembly process, integration difficulty, poor mechanical structure stability, short service life.

To resolve the foregoing technical problem, the following technical solutions are provided in the embodiments of the present invention:

In one aspect, the present invention provides a power-generating insole based on fabric integration, comprising a power-generating insole body, a detachable outer layer and an electronic module, wherein;

The power-generating insole body comprises a first friction is component, a second friction component and a fabric composite component, the first friction component is composed of a first electrode layer and a first polymer material, the fabric composite component is an integrated fabric composed of substrate non-nanofiber fabric and second polymer material, the first friction component and the fabric composite component are integrally formed, the second friction component is wrapped around the middle part formed by the fabric composite component or the first friction component, and is integrated with the first friction component and the fabric composite component;

The detachable outer layer is wrapped in the surface of the power-generating insole body;

The electronic module is connected to the first electrode layer and the second friction component respectively.

Alternatively, the substrate non-nanofiber fabric is distributed in the middle part of the second polymer material or is coated on the surface of the second polymer material and chemically cross-linked with it to form an integrally formed fabric.

Alternatively, the first friction component and the fabric composite component are integrally formed by chemical cross-linking of the second polymer material.

Alternatively, the first electrode layer is a conductive fabric or a conductive high-molecular polymer; The conductive fabric is a knitted is silver cloth, a woven fabric silver cloth or copper-nickel alloy cloth.

Alternatively, the first polymer material is a high-molecular polymer material with electronegativity, the second friction component is any of a conductive yarn with electropositivity and insulating surface or a high-molecular polymer material.

Alternatively, the substrate non-nanofiber fabric is a component of any one of knitted fabric, woven fabric, non-woven fabric or fabric, namely fiber or yarn; The material of the substrate non-nanofiber fabric is a textile material or a metal material.

Alternatively, the second polymer material is a high-molecular polymer with high tear resistance and strong flexibility.

Alternatively, the shape of the fabric composite component is one of U shape, Z shape, O shape and E shape, or a compound mode of a variety of them.

Alternatively, the power-generating insole body is a combined insole combining the forefoot insole and the fabric composite component, or a full-foot insole as all part of the fabric composite component.

Alternatively, the forefoot insole, the integrally formed first friction component, the fabric composite component and the middle part are combined by sewing or pasting to form the combined insole.

Alternatively, the power-generating insole body comprises a support body on the two ends of the fabric composite component, the support is body, the integrally formed first friction component, the fabric composite component and the middle part are combined to form the forefoot insole.

Alternatively, the middle part, the first friction component and the fabric composite component are integrally formed, or the middle part is individually formed by the fabric composite component or the first friction component.

Alternatively, the integrally formed first friction component, the fabric composite component and the middle part form two upper and lower receiving chambers, the first polymer material of the first friction component is located inside the two upper and lower receiving chambers.

Another aspect, the invention provides a manufacturing method of power-generating insole based on fabric integration, comprising:

Heating a liquid uncrosslinked layer of the first polymer material to form a semi-crosslinked layer of the first polymer material, laying the first electrode layer flat on the semi-crosslinked layer of the first polymer material, followed by heating and crosslinking to form the first friction component;

Combining two pieces of the first friction components and two pieces of the substrate non-nanofiber fabrics respectively by the liquid uncrosslinked second polymer material, followed by heating and crosslinking to form a double "L"-shaped fabric composite component;

Wrapping the middle part of the double "L"-shaped fabric composite component with a layer of the second friction component to form the power-generating insole.

Alternatively, before wrapping the middle part of the double "L"-shaped fabric composite component with a layer of the second friction component, further comprising:

Laying the layer of the substrate non-nanofiber fabric flat on a liquid uncrosslinked layer of the second polymer material or coating a layer of a liquid uncrosslinked layer of the second polymer material between two layers of the substrate non-nanofiber fabric, followed by heating and crosslinking to form a flat fabric composite component comprising one or more layers of the substrate non-nanofiber fabric;

Coating a layer of the liquid uncrosslinked layer of the second polymer material on the surface of the flat fabric composite component, causing the flat fabric composite component combines with the double "L"-shaped fabric composite component, followed by heating and crosslinking.

Alternatively, heating the liquid uncrosslinked layer of the first polymer material to form the semi-crosslinked layer of the first polymer material, including:

Coating a liquid uncrosslinked layer of the first polymer material on the surface of the first template;

Putting the first template coated with the uncrosslinked layer of the first polymer material into a vacuum box for vacuum debubbling treatment;

Heating the uncrosslinked layer of the first polymer material after bubble treatment to form the semi-crosslinked layer of the first polymer material, the semi-crosslinked layer of the first polymer material is a semi-crosslinked material between the liquid uncrosslinked layer of the polymer without curing and crosslinking treatment and the crosslinked layer of the first polymer after fully curing and film forming.

Alternatively, before laying a layer of the substrate non-nanofiber fabric flat on the liquid uncrosslinked layer of the second polymer material, further comprising:

Coating the liquid uncrosslinked layer of the second polymer material on the second template;

Putting the second template coated with the uncrosslinked layer of the second polymer material into a vacuum box for vacuum debubbling treatment.

Alternatively, the first template and the second template are polypropylene plates, metal plates or glass plates with a smooth surface. The thickness of the first polymer material or the second polymer material can be controlled by changing the thickness of the edge of the first template or the second template.

Alternatively, the ratio of the content of the substrate non-nanofiber fabric and the content of the first polymer material and the second polymer material is in a range from 0.4 to 1.6.

An embodiment of the present invention has the following beneficial effects: Different from a situation in the prior art, the present invention provides a power-generating insole based on fabric integration, which can convert the human body's own mechanical energy into electrical energy when the human body is walking or running, so as to realize self-power supply and get long service life and stable electrical properties. The entire power-generating insole is made of integrated fabric, which does not contain mechanical parts, and has good flexibility, plasticity, washability and stability.

DESCRIPTION OF THE DRAWINGS

In the following, the present invention will be further explained in combination with the drawings and concrete embodiments. The embodiments shown in the drawings are only for illustrating the present invention and are only schematic diagrams, and do not represent the actual size and shape of the power-generating insole based on fabric integration in the present invention.

DETAILED DESCRIPTION OF THE EMBODIMENTS

In order to fully understand the present invention, a detailed description of the present invention is given below in combination with the drawings and the detailed description of the embodiments.

By means of structural design and material selection, the present invention proposes a power-generating insole based on fabric integration matching with the human walking triggering mode, which has good flexibility, plasticity, washing resistance and stability, and stable or even slightly improved voltage and current after washing for many times and pressing for 100,000 times at the frequency of 3.3 Hz.

The present invention provides a power-generating insole based on fabric integration, comprising a power-generating insole body, a detachable outer layer and an electronic module;

The power-generating insole body comprises a first friction component, a second friction component and a fabric composite component; The first friction component is composed of a first electrode layer and a first polymer material; The first friction component and the fabric composite component are integrally formed; The second friction component is wrapped around the middle part of the fabric composite component, and is integrated with the first friction component and the fabric composite component; The fabric composite component is an integrated fabric composed of substrate non-nanofiber fabric and the second polymer material; The substrate non-nanofiber fabric is distributed in the middle part of the second polymer material or is coated on the surface of the second polymer material and chemically cross-linked with it to form a completely integrated soft fabric; Also by is means of chemical crosslinking, the second polymer material is integrated with the first friction component and the fabric composite component; The detachable outer layer is wrapped in the surface of the power-generating insole body; The electronic module is connected to the power-generating insole;

By adjusting the number of layers and the thickness, the contents of the first polymer material, the substrate non-nanofiber fabric and the second polymer material in the integrated power-generating insole are controlled. The ratio between the content of the substrate non-nanofiber fabric and the total content of the first polymer and second polymer materials of the first friction component is controlled to control the output electrical properties of the power-generating insole, including the output voltage, current and power.

Embodiment 1

Figure 1:
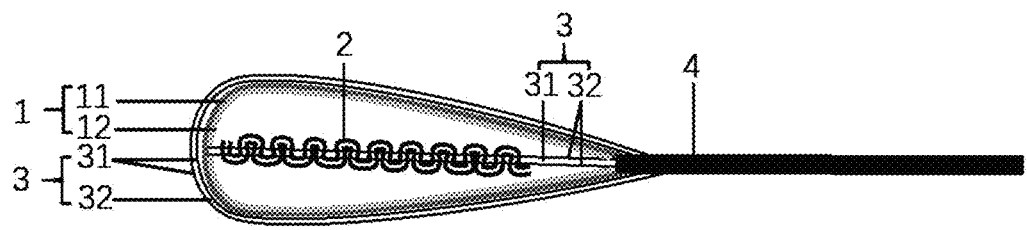
FIG. 1 is a schematic diagram of the structure of a power-generating combined insole based on fabric integration in the present invention.

As shown in FIG. 1, an embodiment of the present invention provides a power-generating combined insole based on fabric integration, comprising a first friction component 1, a second friction component 2, a fabric composite component 3 and the insole forefoot 4; The first friction component 1 is composed of a first electrode layer 11 and a first polymer material 12; The first friction component 1 and the fabric composite component 3 are integrally formed; The second friction component 2 is is wrapped around the middle part of the fabric composite component 3 and is integrated with the first friction component 1 and the fabric composite component 3; The fabric composite component 3 is an integrated fabric composed of the substrate non-nanofiber fabric 31 and the second polymer material 32; The substrate non-nanofiber fabric 31 is distributed in the middle part of the second polymer material 32 or is coated on the surface of the second polymer material 32 and is chemically cross-linked with it to form a completely integrated soft fabric; Also by means of chemical crosslinking, the second polymer material 32 is integrated with the first friction component 1 and the fabric composite component 3; The detachable outer layer is wrapped on the surface of the power-generating insole body; The electronic module is connected to the power-generating insole body;

By sewing or pasting, the insole forefoot 4 and the fabric composite component 3 form a whole.

As shown in FIG. 1, the integrally formed first friction component 1 and the fabric composite component 3 form two upper and lower receiving chambers and a middle part dividing the upper and lower receiving chambers, wherein the middle part is formed by the fabric composite component 3, the first polymer material 12 of the first friction component 1 is located inside the two upper and lower receiving chambers.

According to the present invention, the first electrode layer 11 is a conductive fabric or a conductive high-molecular polymer. Preferably, the conductive fabric as the electrode layer has the advantages of low production cost, simple process, washing resistance, good comfort and practicability. The conductive fabric is knitted silver cloth, woven silver cloth or copper-nickel alloy cloth. Furthermore, according to this embodiment, the conductive fabric is made of knitted silver cloth, which has good tensile and permeability properties, and facilitates the composite integration of polymer materials.

The first polymer material 12 is a high-molecular polymer material with electronegativity.

The first friction component 1 is composed of the first electrode layer 11 and the first polymer material 12, which can be integrated not only by chemical crosslinking but also by pasting.

According to the present invention, the substrate non-nanofiber fabric 31 is a component of knitted fabric, woven fabric, non-woven fabric or fabric, namely fiber or yarn; The material of the substrate non-nanofiber fabric 31 is a textile material or a metal material. The metal material includes but is not limited to stainless steel woven fabric. Furthermore, according to this embodiment, the substrate non-nanofiber fabric 31 is made of woven cotton cloth, which is flat and has good hydrophilicity, and can be tightly cross-linked with the second polymer material 32.

According to the present invention, the fabric composite component 3 is an integrated fabric composed of the substrate non-nanofiber fabric 31 and the second polymer material 32, and can also be a similar high-molecular polymer product that has the elasticity of a fabric composite component, including but not limited to silicone and polyimide.

The second friction component 2 is a conductive yarn or a high-molecular polymer material with electropositivity and surface insulation. According to this embodiment, the second friction component 2 is wrapped on the surface of the fabric composite component 3 and is integrated with the first friction component 1 and the fabric composite component 3.

According to this embodiment, the first friction component 1 and the second friction component 2 can be integrated either by chemical crosslinking or by suturing the fabric composite component 3.

The second polymer material 32 is a high-molecular polymer with high tear resistance and strong flexibility.

According to the present invention, the shape of the fabric composite component 3 is one of U shape, Z shape, O shape and E shape, or a compound mode of a variety of them. Furthermore, according to this embodiment, the fabric composite component 3 has a U-shaped structure.

The ratio between the content of the substrate non-nanofiber fabric 31 and the total content of the first polymer material 12 of the first friction is component and the second polymer material 32 is controlled to control the output electrical properties of the power-generating insole, including the output voltage, current and power.

For the power-generating insole based on fabric integration provided by the embodiment of the present invention, the flat fabric composite component 3 has a two-layer structure and a thickness of 2 mm selected, and the thickness of the overall insole can be controlled within 8~15 mm. The power-generating insole has good electrical properties. Through structural design and material selection, the open circuit voltage and short circuit current of a single power-generating insole based on fabric integration (with a structure as shown in FIG. 1) are 65V and 9 µA respectively under the condition of slow walking, and are 300V and 70 µA respectively under the condition of stepping.

Figure 2:
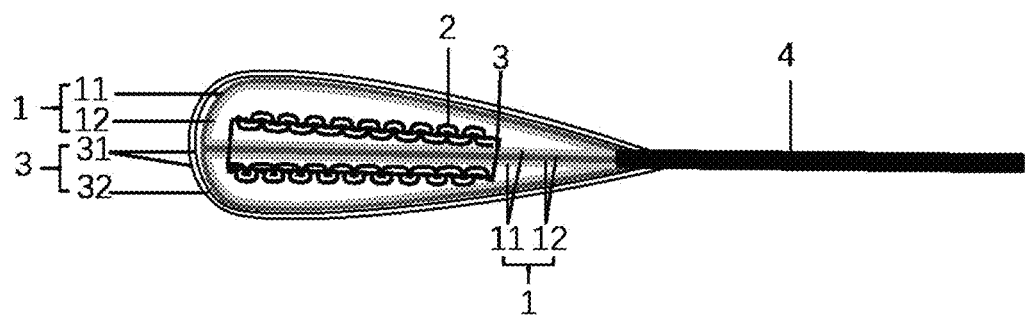
FIG. 2 is a schematic diagram of the structure of a multi-layer is power-generating combined insole based on fabric integration in the present invention.

As shown in FIG. 2, in order to further improve the power generation efficiency of the power-generating insole based on fabric integration in the limited space of the insole, the multi-layer power-generating combined insole based on fabric integration can be used. The open circuit voltage and short circuit current of it are 100V and 12 µA respectively under the condition of slow walking, which can reach 400V and 100 µA respectively under the condition of stepping.

Embodiment 2

Figure 3:
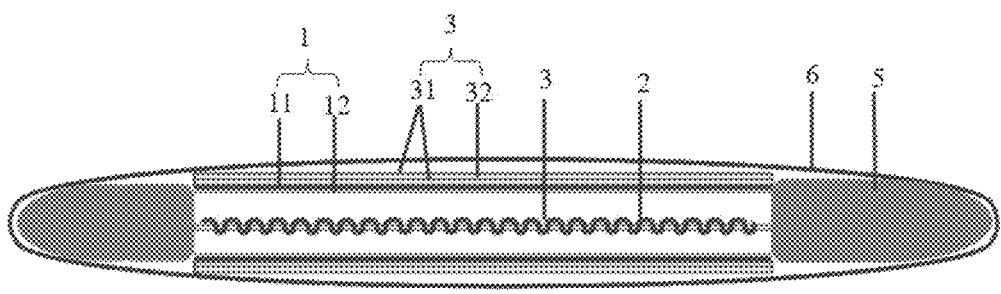
FIG. 3 is a schematic diagram of the structure of a power-generating full sole insole based on fabric integration in the present invention.

As shown in FIG. 3, an embodiment of the present invention provides a power-generating full sole insole based on fabric integration, comprising a first friction component 1, a second friction component 2, a fabric composite component 3, a support body 5 and a detachable outer layer 6; The first friction component 1 is composed of a first electrode layer 11 and a first polymer material 12; The first friction component 1 and the fabric composite component 3 are integrally formed; The second friction component 2 is wrapped around the middle part of the fabric composite component 3 and is integrated with the first friction component 1 and the fabric composite component 3; The fabric composite component 3 is an integrated fabric composed of the substrate non-nanofiber fabric 31 and the second polymer material 32; The substrate non-nanofiber fabric 31 is distributed in the middle part of the second polymer material 32 or is coated on the surface of the second polymer material 32 and is chemically cross-linked with it to form a completely integrated soft fabric; Also by means of chemical crosslinking, the second polymer material 32 is integrated with the first friction component 1 and the fabric composite component 3; The support body 5 is placed on the two ends of the fabric composite component 3; The detachable outer layer 6 is wrapped on the surface of the fabric composite component 3 and the support body 5.

As shown in FIG. 3, two integrally formed first friction components 1 and the fabric composite component 3 form two upper and lower receiving chambers and a middle part dividing the upper and lower receiving chambers. The middle part is a single fabric composite component 3. In some embodiments, the middle part is one or more single first friction components 1. The support body 5, two integrally formed first friction components 1, the fabric composite component 3 and the middle part are attached to form full-foot insole.

According to the present invention, the first electrode layer 11 is a conductive fabric or a conductive high-molecular polymer. Preferably, the conductive fabric as the electrode layer has the advantages of low production cost, simple process, washing resistance, good comfort and practicability. The conductive fabric is knitted silver cloth, woven silver cloth or copper-nickel alloy cloth. Furthermore, according to this embodiment, the conductive fabric is made of knitted silver cloth, which has good tensile and permeability properties, and facilitates the composite integration of polymer materials.

The first polymer material 12 is a high-molecular polymer material with electronegativity.

The first friction component 1 is composed of the first electrode layer 11 and the first polymer material 12, which can be integrated not only by chemical crosslinking but also by pasting.

According to the present invention, the substrate non-nanofiber fabric 31 is a component of knitted fabric, woven fabric, non-woven fabric or fabric, namely fiber or yarn; The material of the substrate non-nanofiber fabric 31 is a textile material or a metal material. The metal material includes but is not limited to stainless steel woven fabric. Furthermore, according to this embodiment, the substrate non-nanofiber fabric 31 is made of woven cotton cloth, which is flat and has good hydrophilicity, and can be tightly cross-linked with the second polymer material 32.

According to the present invention, the fabric composite component 3 is an integrated fabric composed of the substrate non-nanofiber fabric 31 and the second polymer material 32, and can also be a similar high-molecular polymer product that has the elasticity of a fabric composite component, including but not limited to silicone and polyimide.

The second friction component 2 is a conductive yarn or a high-molecular polymer material with electropositivity and surface insulation. According to this embodiment, the second friction component 2 is wrapped on the surface of the fabric composite component 3 and is integrated with the first friction component 1 and the fabric composite component 3. According to this embodiment, the first friction component 1 and the second friction component 2 can be integrated either by chemical crosslinking or by suturing the fabric composite component 3.

The second polymer material 32 is a high-molecular polymer with high tear resistance and strong flexibility.

Figure 4:
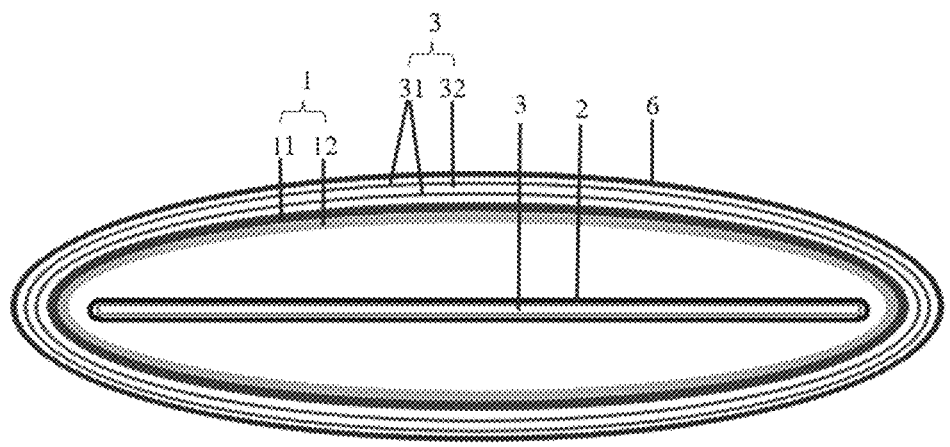
FIG. 4 is a cross-sectional view of a power-generating full sole insole based on fabric integration in the present invention.

According to the present invention, the shape of the fabric composite component 3 is one of U shape, Z shape, O shape and E shape, or a compound mode of a variety of them. As shown in FIG. 4, furthermore, according to this embodiment, the fabric composite component 3 has an O-shaped structure.

According to this embodiment, the support body 5 is made of elastic material, including but not limited to sponge and spacer fabric. In this embodiment, spacer fabric is used, which has the characteristics of softness, good comfort, tailorability and simple process, and facilitates the assembly of the insole.

According to the present invention, the detachable outer layer 6 is knitted fabric, woven fabric or non-woven fabric. Furthermore, according to this embodiment, the detachable outer layer 6 is made of woven cotton cloth, which has good air permeability and wearing comfort.

The ratio between the content of the substrate non-nanofiber fabric 31 and the total content of the first polymer material 12 of the first friction component and the second polymer material 32 is controlled to control the output electrical properties of the power-generating insole, including the output voltage, current and power.

In this embodiment, the flat fabric composite component 3 has a two-layer structure, with a thickness of 2 mm, and the thickness of the insole can be controlled within 10-20 mm.

The power-generating full sole insole based on fabric integration provided in the embodiment of the present invention has good electrical properties. The open circuit voltage and short circuit current of it are 100V and 15 μA, respectively under the condition of slow walking, which can reach 500V and 130 μA under the condition of stepping.

Figure 5:
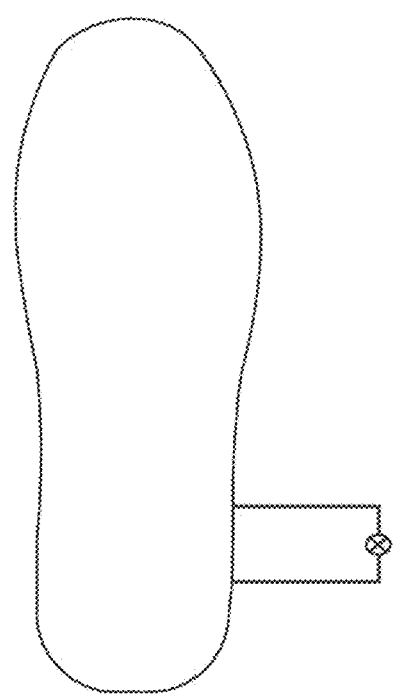
FIG. 5 is a schematic diagram of the direct connection of the power-generating insole based on fabric integration to the LED lamp.
Figure 6:
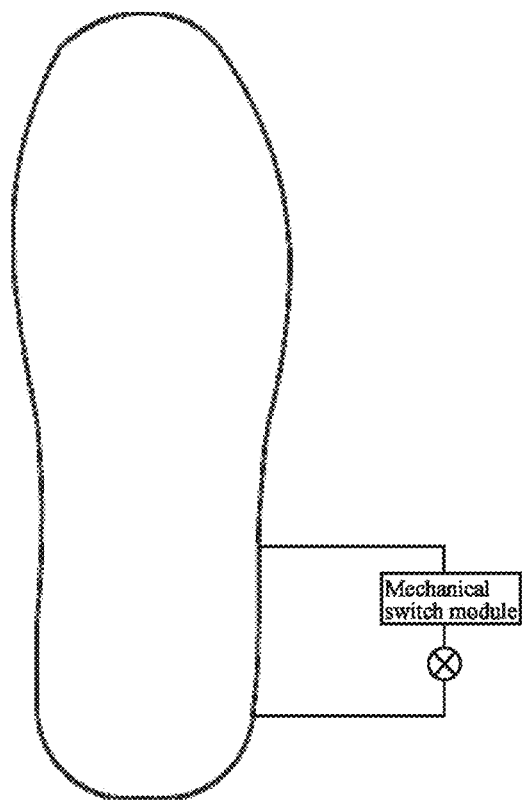
FIG. 6 is a schematic diagram of the mechanical switch module controlling the LED lamp of the power-generating insole based on fabric integration in the present invention.
Figure 7:
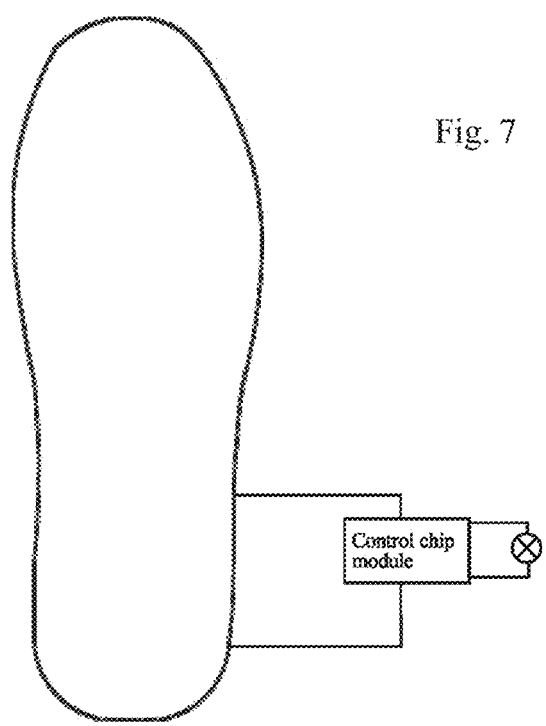
FIG. 7 is a schematic diagram of the control chip module controlling the LED lamp of the power-generating insole based on fabric integration in the present invention.
Figure 8:
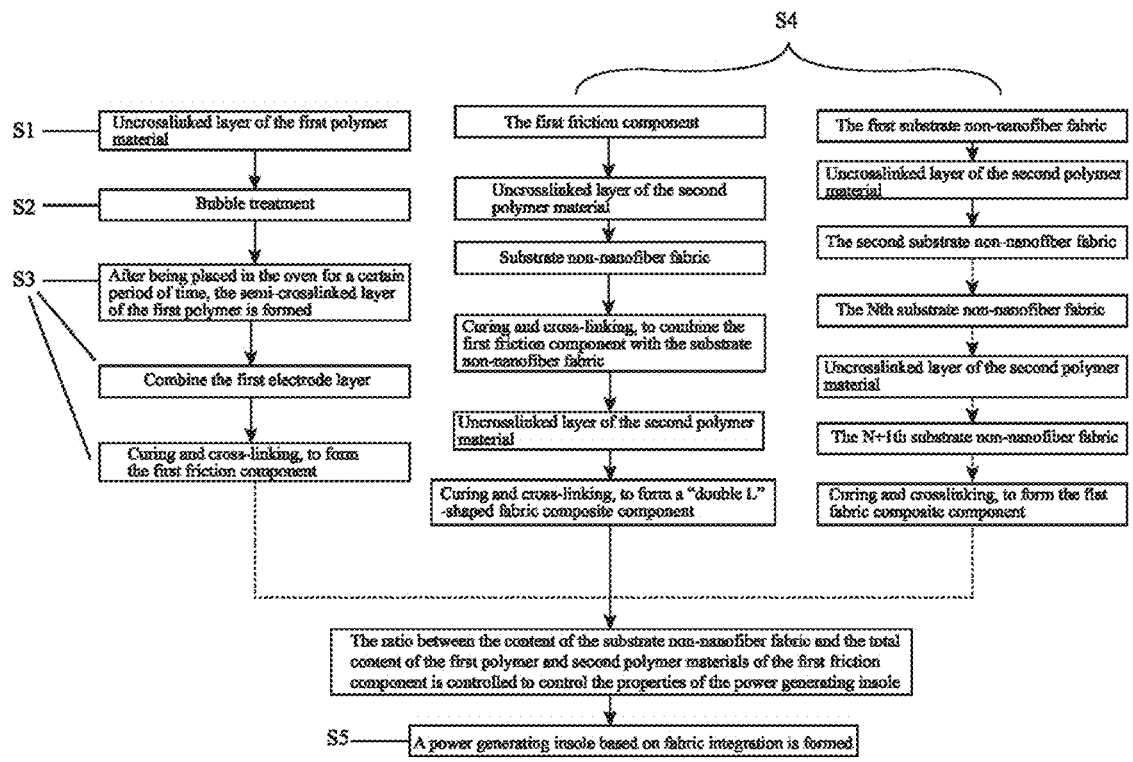
FIG. 8 is a flow chart of a method for preparing a power-generating insole based on fabric integration in the present invention.

In the present invention, the electronic module is connected to the first electrode layer 11 and the second friction component 2; The electronic module comprises an LED lamp, a mechanical switch, a control chip or a Bluetooth. As shown in FIGS. 5-7, the power-generating insole based on fabric integration can be directly connected to the LED lamp, and can control the brightness of the LED lamp through a mechanical switch or a control chip, and the number of LED lamps can be one or more. It shall be noted that in FIGS. 5-7, the positions of the power-generating insole based on fabric integration and the electronic module are only schematic, and do not represent the actual effect of the present invention.

A description of a method for preparing a power-generating insole based on fabric integration is given below according to the embodiments of the present invention and in combination with the drawings 8-16, which includes:

S1 The Uncrosslinked Layer 12 of the First Polymer Material is Formed

Specifically, the liquid uncrosslinked layer 12 of the first polymer material is coated on the surface of the first template, and the thickness of uncrosslinked layer 12 of the first polymer material in the integrated insole is controlled by controlling the thickness of the edge of the template, to obtain the uncrosslinked layer 12 of the first polymer material of a certain thickness;

According to the present invention, in the above—embodiment, an electronegative material such as polydimethylsiloxane (PDMS) is used as the first polymer material 12, and 0.4% silver nanoparticles or 10% barium carbonate nanoparticles are doped to form the liquid uncrosslinked layer 12 of the first polymer material. This doped polymer material is characterized by high electrical properties.

S2 Bubble Treatment

Specifically, the first template which is coated with the uncrosslinked layer 12 of the first polymer material is put into a vacuum box for vacuum debubbling treatment, with the purpose to eliminate air bubbles in the material.

S3 The First Friction Component 1 is Formed

Figure 9:
FIG. 9 is a schematic diagram of the structure of the first friction component in the present invention.

Specifically, the uncrosslinked layer 12 of the first polymer material after bubble treatment is put into an oven, and taken out of the oven after a short period of preliminary heating to form a semi-crosslinked layer 12 of the first polymer material. Subsequently, the first electrode layer 11 is laid flat on the semi-crosslinked layer 12 of the first polymer material, and heated in an oven, to achieve complete cross-linking; Finally, the first polymer material 12 and the first electrode layer 11 are combined to form the first friction component 1, as shown in FIG. 9.

S4 The Fabric Composite Component 3 is Formed

Figure 10:
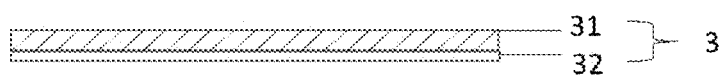
FIG. 10 is a schematic diagram of the structure of a flat fabric composite component based on a layer of substrate non-nanofiber fabric in the present invention.

As shown in FIG. 10, first, the surface of the second template is coated with the liquid uncrosslinked layer 32 of the second polymer material, and then undergoes debubbling treatment; Finally, the substrate non-nanofiber fabric 31 is laid flat on the uncrosslinked layer 32 of the second polymer material, and they are put into the oven together for heating to achieve complete cross-linking, so as to obtain the flat fabric composite component 3.

Figure 11:
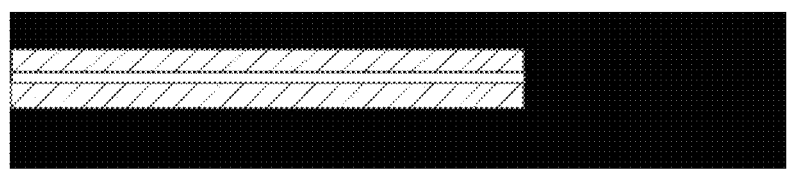
FIG. 11 is a schematic diagram of the structure of a flat fabric composite is component based on two layers of substrate non-nanofiber fabric in the present invention.

As shown in FIG. 11, when two layers of substrate non-nanofiber fabric 31 are prepared, the surface of a layer of the substrate non-nanofiber fabric 31 is first coated with an uncrosslinked layer 32 of the second polymer material; Then, a second layer of substrate non-nanofiber fabric 31 is overlaid on the uncrosslinked layer 32 of the second polymer material so that the uncrosslinked layer 32 of the second polymer material is completely immersed in the second layer of substrate non-nanofiber fabric 31, and finally, they are put into the oven together is for heating to achieve complete cross-linking, so as to obtain the flat fabric composite component 3. By using this method, two layers of non-nanofiber fabric 31 can be closely integrated with each other, so as to achieve an integrated fabric composite component 3 with high resilience, comfort and texture.

Figure 12:
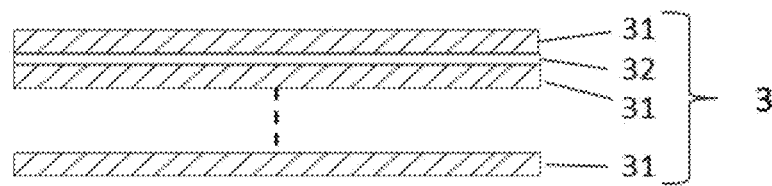
FIG. 12 is a schematic diagram of the structure of a flat fabric composite component based on N layers of substrate non-nanofiber fabric in the present invention.
Figure 13:
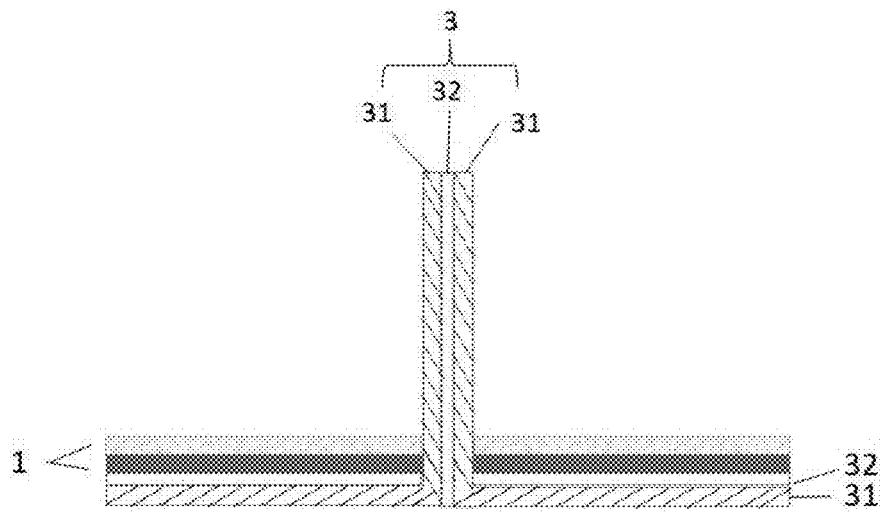
FIG. 13 is a schematic diagram of the structure of the double "L"-shaped fabric composite component in the present invention.

The flat fabric composite component 3 comprises one or more layers of substrate non-nanofiber fabric 31. When preparing N layers of substrate non-nanofiber fabric 31, the above-production steps can be repeated, as shown in FIG. 12;

Besides, as shown in FIG. 13, two pieces of the first friction components 1 and two pieces of the substrate non-nanofiber fabrics 31 are respectively combined by the liquid uncrosslinked second polymer material 32, and heated so that they are cured and crosslinked to form a double "L"-shaped fabric composite component 3;

In some embodiments, in order to make the power-generating insole structure more stable and better sealed, it is also used to cross-link "L"-shaped fabric composite component with the flat fabric composite component 3, which specifically includes:

S5 The Power-Generating Insole Based on Fabric Integration is Formed

Figure 14:
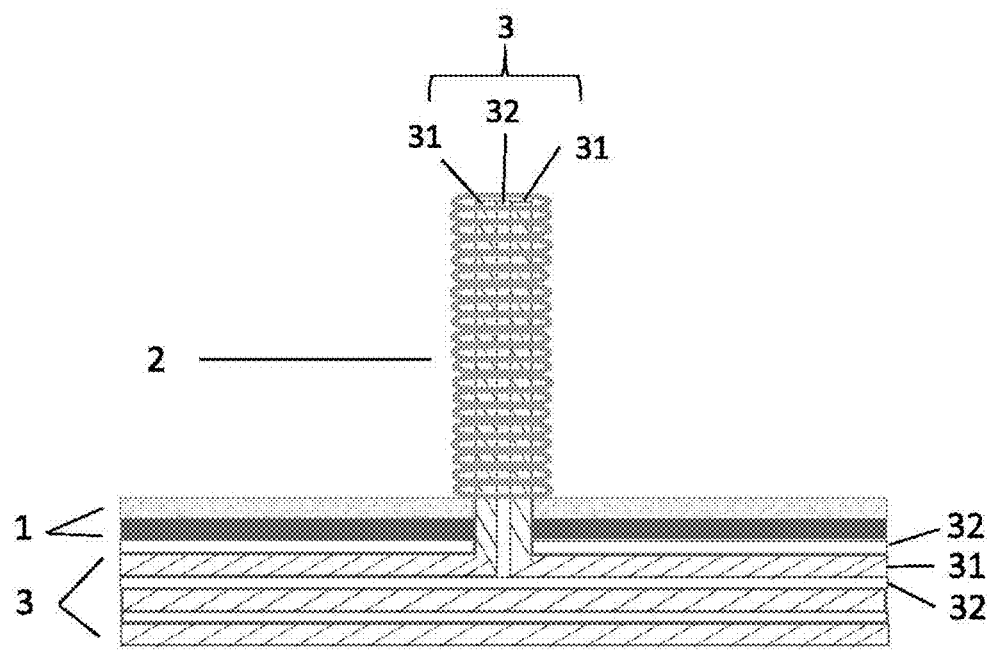
FIG. 14 is a schematic diagram of the structure of a power-generating insole based on the integration of two layers of substrate non-nanofiber fabric in the present invention.
Figure 15:
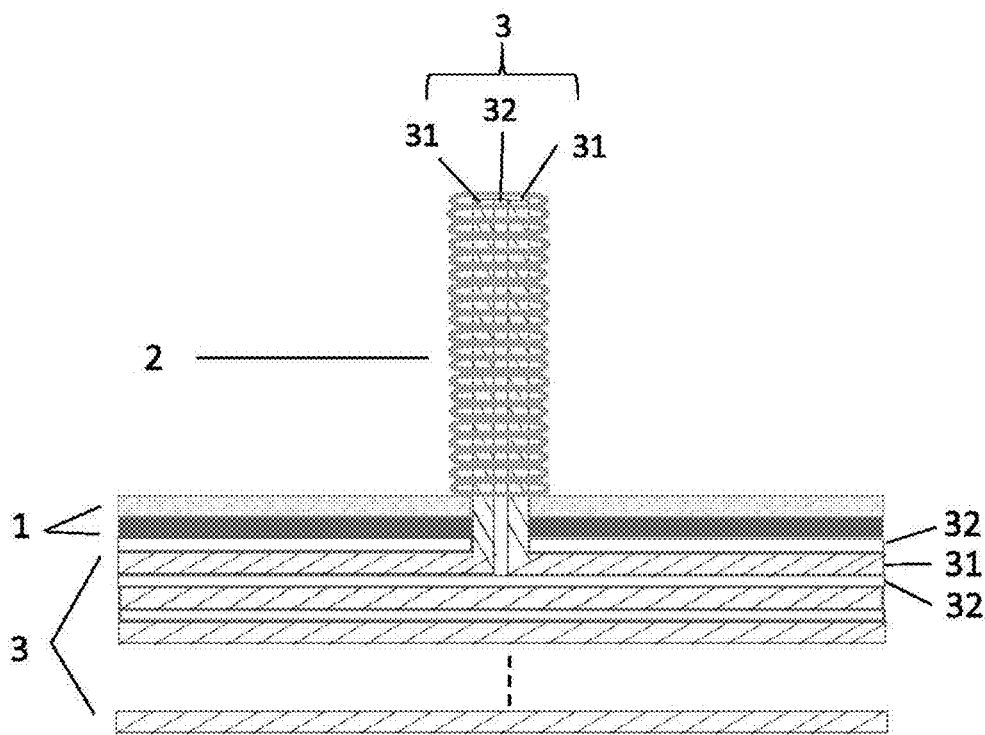
FIG. 15 is a schematic diagram of the structure of the power-generating insole based on the integration of N layers of substrate non-nanofiber fabric in the present invention.

First, the surface of the flat fabric composite component 3 is coated with an liquid uncrosslinked layer of the second polymer material to is make it tightly combined with the double "L"-shaped fabric composite component, and perform heating to realize curing and crosslinking, to form an integration of the first friction component 1 and the flat fabric composite component 3; Finally, the middle layer of the integration is wrapped a layer of the second friction component 2 to form the power-generating insole based on the fabric integration, as shown in FIG. 14. FIG. 15 shows the power-generating insole based on fabric integration formed by selecting N layers of the substrate non-nanofiber fabric 31 and combining the second polymer material 32 with the first friction component 1, and wrapping the second friction component 2 in the middle layer.

The first template is a polypropylene plate, a metal plate or a glass plate with a smooth surface.

The thickness of the first polymer material 12 can be controlled by changing the thickness of the edge of the template.

The method for coating of the polymer material is a scrape coating method, through which an uncrosslinked layer of the polymer material with a flat surface and a uniform thickness can be obtained.

The liquid uncrosslinked layer 12 of the first polymer material is a polymer material that has not been cured and crosslinked.

The bubble treatment is to process the uncrosslinked layer 12 of the first polymer material through a vacuum device until there is no bubble.

The semi-crosslinked layer 12 of the first polymer material is a semi-crosslinked material between the liquid uncrosslinked layer of the polymer without curing and crosslinking treatment and the crosslinked layer 12 of the first polymer after fully curing and film forming.

The fabric composite component 3, the first friction component 1, and the integration of the first friction component 1 and the flat fabric composite component 3 is all formed by chemical cross-linking of the first polymer material 12 and the second polymer material 32.

According to the present invention, in the above—embodiment, a high-molecular polymer with high tear resistance and strong flexibility, such as silicone, is used as the second polymer material 32.

The second friction component 2 is a conductive yarn or high-molecular polymer material with electropositivity and surface insulation, including but not limited to enameled copper wire, nitrile rubber, nylon and the mixture of nylon doped poly (3,4-ethylenedioxythiophene) and polystyrene sulfonate. Furthermore, in the above-embodiment, enameled copper wire is used.

By adjusting the number of layers and the thickness, the contents of the first polymer material 12, the substrate non-nanofiber fabric 31 and the second polymer material 32 in the integrated power-generating insole are controlled. The ratio between the content of the substrate non-nanofiber fabric 31 and the total content of the first polymer material 12 of the first friction component and the second polymer material 32 is controlled to control the output electrical properties of the power-generating insole, including the output voltage, current and power.

Figure 16:
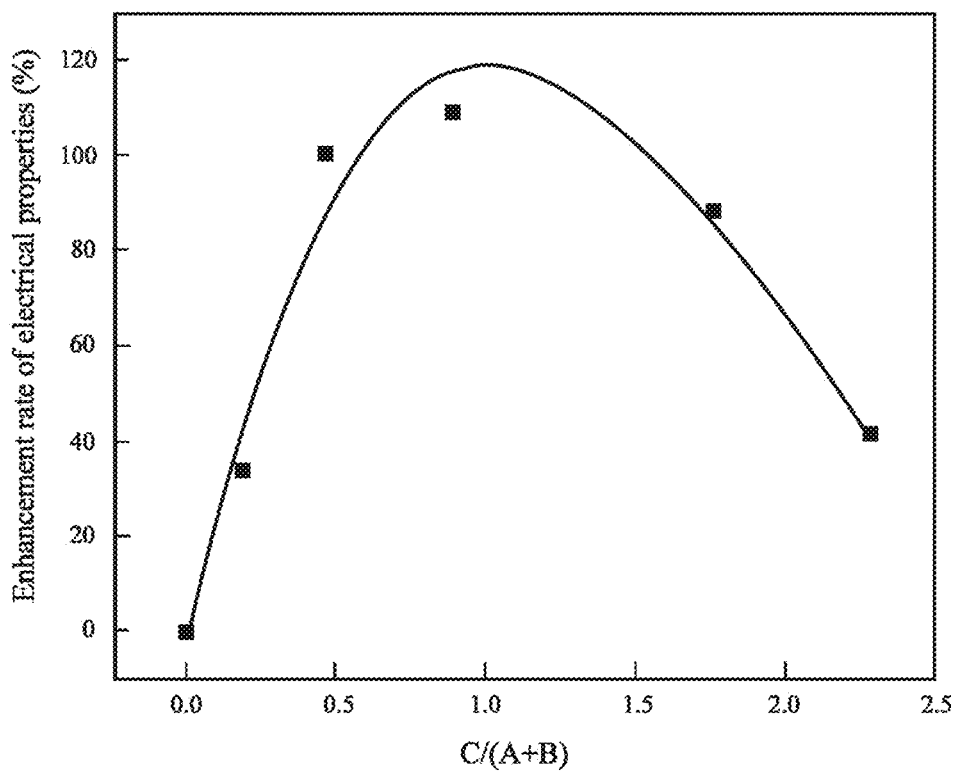
FIG. 16 shows the influence of the ratio between the content of substrate non-nanofiber fabric and the total content of the first polymer and second polymer materials on the electrical properties of the power-generating insole in the present invention.

As shown in FIG. 16, "A" represents the content of the first polymer material 12, "B" represents the content of the second polymer material 32, and "C" represents the content of the substrate non-nanofiber fabric 31, and "A+B" represents the total content of the first polymer material 12 and the second polymer material 32. The abscissa in the figure represents the ratio between the content of the substrate non-nanofiber fabric 31 and the total content of the first polymer 12 of the first friction component 1 and the second polymer material 32, and the ordinate represents the enhancement rate of the electrical properties of the power-generating insole based on fabric integration. In the present invention, the voltage value is taken as an example. When the C value is 0, that is, when the substrate non-nanofiber fabric 31 is not added as the control group, the enhancement rate of the electrical properties is 0%. As the value of "C/(A+B)" gradually increases, the enhancement rate of the electrical properties increases first and then decreases. When the value of "C/(A+B)" is between 0.4 and 1.6, the enhancement rate of the electrical properties is higher.

According to the present invention, in the above—embodiment of the present invention, two layers of the substrate non-nanofiber fabric 31 and is the second polymer material 32 are combined to form the flat fabric composite component 3.

The production method and practical application of a power generating insole based on fabric integration provided by the present invention are described above. It shall be noted that the above contents are only better embodiments of the present invention and shall not limit the scope of the technical scheme of embodiments of the present invention. The technicians, in the field of the invention, can modify the implementation plan of the invention according to the actual purpose and requirements, or carry out equivalent replacement for a part of the technical features, but both of the modification and the replacement are in the scope of protection of the invention.

What is claimed is:

1. An integrated fabric based power-generating insole, comprising a power-generating insole body, a detachable outer layer and an electronic module, wherein the power-generating insole body comprises a first friction component, a second friction component and a fabric composite component, the first friction component is composed of a first electrode layer and a first polymer material, the fabric composite component is an integrated fabric composed of substrate non-nanofiber fabric and second polymer material, the first friction component and the fabric composite component are integrally formed a double "L"-shaped composite component with a middle part and two side part;

wherein the two side parts are bent towards the middle part to form an upper receiving chamber and a lower receiving chamber, and the first polymer material of the first friction component is located inside the upper and lower receiving chambers;

the second friction component is wrapped around the middle part of the double "L"-shaped composite component, wherein the middle part is formed by the fabric composite component, and is integrated with the first friction component and the fabric composite component, the detachable outer layer is wrapped in the surface of the power-generating insole body, the electronic module is connected to the first electrode layer and the second friction component respectively;

wherein a value of C/(A+B) is between 0.4 and 1.6, "A" represents the content of the first polymer material, "B" represents the content of the second polymer material, and "C" represents the content of the substrate non-nanofiber fabric.

2. The power-generating insole of claim 1, wherein:
the substrate non-nanofiber fabric is chemically cross-linked with the second polymer material.

3. The power-generating insole of claim 1, wherein:
the first friction component and the fabric composite component are integrally formed by chemical cross-linking of the second polymer material.

4. The power-generating insole of claim 1, wherein:
the first electrode layer is a conductive fabric or a conductive high-molecular polymer, the conductive fabric is any of a knitted silver cloth, a woven fabric silver cloth or copper-nickel alloy cloth.

5. The power-generating insole of claim 1, wherein:
the first polymer material is a high-molecular polymer material with electronegativity, the second friction component is any of a conductive yarn with electropositivity and insulating surface or a high-molecular polymer material.

6. The power-generating insole of claim 1, wherein:
the substrate non-nanofiber fabric is a component of any one of knitted fabric, woven fabric, non-woven fabric or fabric, namely fiber or yarn; The material of the substrate non-nanofiber fabric is a textile material or a metal material.

7. The power-generating insole of claim 1, wherein:
the second polymer material is a high-molecular polymer with high tear resistance and strong flexibility.

8. The power-generating insole of claim 1, wherein:
the shape of the fabric composite component is one of U shape, Z shape, O shape and E shape, or a compound mode of a variety of them.

9. The power-generating insole of claim 1, wherein:
the power-generating insole body is a combined insole combining the forefoot insole and the fabric composite component, or a full-foot insole as all part of the fabric composite component.

10. The power-generating insole of claim 9, wherein:
the forefoot insole, the integrally formed first friction component, the fabric composite component and the middle part are combined by sewing or pasting to form the combined insole.

11. The power-generating insole of claim 9, wherein:
the power-generating insole body comprises a support body on the two ends of the fabric composite component, the support body, the integrally formed first friction component, the fabric composite component and the middle part are combined to form the forefoot insole.

12. The power-generating insole of claim 1, wherein:
the middle part, the first friction component and the fabric composite component are integrally formed, or the middle part is individually formed by the fabric composite component or the first friction component.

* * * * *